United States Patent
Ghabra et al.

(10) Patent No.: US 9,262,878 B1
(45) Date of Patent: *Feb. 16, 2016

(54) SYSTEM AND METHOD FOR ONE-WAY REMOTE ACTIVATION WITH ADAPTIVE PROTOCOL

(75) Inventors: Riad Ghabra, Dearborn Heights, MI (US); Ronald O. King, Brownstown, MI (US); John S. Nantz, Brighton, MI (US); Tom Q. Tang, Novi, MI (US); Yi Luo, Ypsilanti, MI (US)

(73) Assignee: Lear Corporation, Southfield, MI (US)

( * ) Notice: Subject to any disclaimer, the term of this patent is extended or adjusted under 35 U.S.C. 154(b) by 1688 days.

This patent is subject to a terminal disclaimer.

(21) Appl. No.: 11/536,200

(22) Filed: Sep. 28, 2006

(51) Int. Cl.
*G07C 9/00* (2006.01)
*H04L 27/00* (2006.01)

(52) U.S. Cl.
CPC ........ *G07C 9/00174* (2013.01); *H04L 27/0008* (2013.01); *G07C 2009/00198* (2013.01); *G07C 2009/00206* (2013.01); *G07C 2009/00261* (2013.01); *G07C 2009/00357* (2013.01)

(58) Field of Classification Search
CPC ................. G07C 9/00174; G07C 2009/00261; G07C 2009/00357; G07C 2009/00206; G07C 2009/00198; H04L 27/0008
USPC ....................................................... 340/5.61
See application file for complete search history.

(56) References Cited

U.S. PATENT DOCUMENTS

| 5,079,768 | A | 1/1992 | Flammer |
| 5,245,346 | A | 9/1993 | Nishimura et al. |
| 5,751,197 | A | 5/1998 | Boling, III |
| 5,980,925 | A | 11/1999 | Jampani et al. |
| 6,101,428 | A | * 8/2000 | Snyder ............................. 701/2 |
| 6,169,492 | B1 | 1/2001 | Dabbish |
| 6,212,240 | B1 | * 4/2001 | Scheibel et al. ............... 375/261 |
| 6,420,967 | B1 | 7/2002 | Ghabra et al. |
| 6,424,056 | B1 | 7/2002 | Irvin |
| 6,519,279 | B1 | * 2/2003 | Abdesselem et al. ......... 375/219 |
| 6,549,115 | B1 | 4/2003 | Daiss et al. |
| 6,586,988 | B2 | 7/2003 | Arisawa |
| 6,617,961 | B1 | 9/2003 | Janssen et al. |
| 6,624,758 | B1 | * 9/2003 | Omata et al. ............. 340/426.36 |
| 6,629,776 | B2 | 10/2003 | Bell et al. |
| 6,714,119 | B1 | 3/2004 | Mindl et al. |
| 6,718,240 | B1 | 4/2004 | Suda et al. |
| 6,738,394 | B1 | 5/2004 | Kreuzgruber et al. |

(Continued)

FOREIGN PATENT DOCUMENTS

DE   10233909 A1   2/2004
EP    1187346 A2   3/2002

OTHER PUBLICATIONS

Office Action for U.S. Appl. No. 11/536,187 dated Oct. 28, 2009.

(Continued)

*Primary Examiner* — Brian Zimmerman
*Assistant Examiner* — Sara Samson
(74) *Attorney, Agent, or Firm* — Brooks Kushman P.C.

(57) ABSTRACT

A system and method for remote activation of a device includes, in one embodiment, transmitting a command signal according to one of a first transmission protocol and a second transmission protocol, and selecting the first transmission protocol for use in transmitting the command signal when a selected command is of a first type, and selecting the second transmission protocol for use in transmitting the command signal when a selected command is of a second.

18 Claims, 2 Drawing Sheets

(56) References Cited

U.S. PATENT DOCUMENTS

| | | | |
|---|---|---|---|
| 6,885,282 | B2 | 4/2005 | Desai et al. |
| 6,885,283 | B2 | 4/2005 | O'Connor et al. |
| 6,980,925 | B2 * | 12/2005 | Zheng .................. B60C 23/064 340/679 |
| 7,095,316 | B2 | 8/2006 | Kachouh et al. |
| 7,102,498 | B2 | 9/2006 | Desai et al. |
| 7,724,125 | B2 | 5/2010 | Ghabra et al. |
| 2002/0101340 | A1 | 8/2002 | Starkey |
| 2002/0171537 | A1 | 11/2002 | Ghabra et al. |
| 2003/0076221 | A1 | 4/2003 | Akiyama et al. |
| 2003/0122660 | A1 | 7/2003 | Kachouh et al. |
| 2004/0036625 | A1 | 2/2004 | Omata et al. |
| 2005/0003781 | A1 | 1/2005 | Kunz et al. |
| 2005/0083175 | A1 | 4/2005 | Yanagimoto |
| 2005/0134428 | A1 | 6/2005 | Desai et al. |
| 2005/0182306 | A1 | 8/2005 | Sloan |
| 2005/0232376 | A1 | 10/2005 | Liem et al. |
| 2005/0272436 | A1 | 12/2005 | Trott et al. |
| 2006/0077037 | A1 | 4/2006 | Luo et al. |
| 2006/0093026 | A1 | 5/2006 | Montojo et al. |
| 2006/0125599 | A1 | 6/2006 | Ghabra et al. |
| 2006/0139158 | A1 | 6/2006 | Miller et al. |
| 2006/0232377 | A1 | 10/2006 | Witkowski |
| 2006/0267744 | A1 | 11/2006 | Baumgartner |
| 2007/0164876 | A1 * | 7/2007 | Ostrander et al. ....... 340/825.72 |
| 2007/0268110 | A1 * | 11/2007 | Little ........................... 340/5.62 |
| 2008/0079603 | A1 | 4/2008 | King et al. |
| 2008/0088411 | A1 | 4/2008 | Ghabra |
| 2009/0309753 | A1 | 12/2009 | Ghabra et al. |

OTHER PUBLICATIONS

Office Action for U.S. Appl. No. 11/536,209 dated Aug. 25, 2009.
Final Office Action for U.S. Appl. No. 11/536,209 dated Nov. 10, 2009.
United States Patent and Trademark Office, Office Action for U.S. Appl. No. 11/536,225 mailed Sep. 17, 2009.
United States Patent and Trademark Office, Office Action for U.S. Appl. No. 11/536,255 mailed Aug. 19, 2009.
United States Patent and Trademark Office, Notice of Allowance and Fee(s) Due for U.S. Appl. No. 11/536,290 mailed Feb. 4, 2010.
United States Patent and Trademark Office, Final Office Action for U.S. Appl. No. 11/536,290 mailed Nov. 25, 2009.
United States Patent and Trademark Office, Office Action for U.S. Appl. No. 11/536,290 mailed Sep. 17, 2009.
Final Office Action for U.S. Appl. No. 11/536,225 dated Mar. 3, 2010.
Office Action for U.S. Appl. No. 11/536,209 dated Mar. 10, 2010.
Office Action for U.S. Appl. No. 11/536,187 dated Jun. 9, 2010.
Office Action for U.S. Appl. No. 11/536,255 dated Mar. 16, 2010.
Office Action for U.S. Appl. No. 11/536,225 dated Jul. 20, 2010.
Office Action for U.S. Appl. No. 11/536,209 dated Jun. 4, 2010.
Notice of Allowance for U.S. Appl. No. 11/536,255 dated Jan. 21, 2011.
Office Action for U.S. Appl. No. 11/536,225 dated Jan. 18, 2011.
Office Action for U.S. Appl. No. 11/536,209 dated Oct. 27, 2010.
Office Action for U.S. Appl. No. 11/536,187 dated Oct. 5, 2010.
Notice of Allowance for U.S. Appl. No. 11/536,187 dated Jan. 31, 2011.
Supplemental Notice of Allowance for U.S. Appl. No. 11/536,187 dated Feb. 14, 2011.
Supplemental Notice of Allowance for U.S. Appl. No. 11/536,187 dated Feb. 23, 2011.
Supplemental Notice of Allowance for U.S. Appl. No. 11/536,187 dated Mar. 17, 2011.
Final Office Action for U.S. Appl. No. 11/536,209 dated Feb. 18, 2011.
Supplemental Notice of Allowance for U.S. Appl. No. 11/536,187 dated Mar. 31, 2011.
Office Action for U.S. Appl. No. 11/536,209 dated Jun. 16, 2011.
Final Office Action for U.S. Appl. No. 11/536,209 dated Nov. 4, 2011.
Notice of Allowance for U.S. Appl. No. 11/536,209 mailed Feb. 6, 2015.
Notice of Allowance for U.S. Appl. No. 11/536,209 mailed Apr. 3, 2015.
Notice of Allowance for U.S. Appl. No. 11/536,225 mailed Sep. 4, 2014.

* cited by examiner

SYSTEM AND METHOD FOR ONE-WAY REMOTE ACTIVATION WITH ADAPTIVE PROTOCOL

TECHNICAL FIELD

The following relates to a system and method for wireless remote activation of devices in a vehicular environment.

A detailed description and accompanying drawings are set forth below.

DETAILED DESCRIPTION

Figure 1:
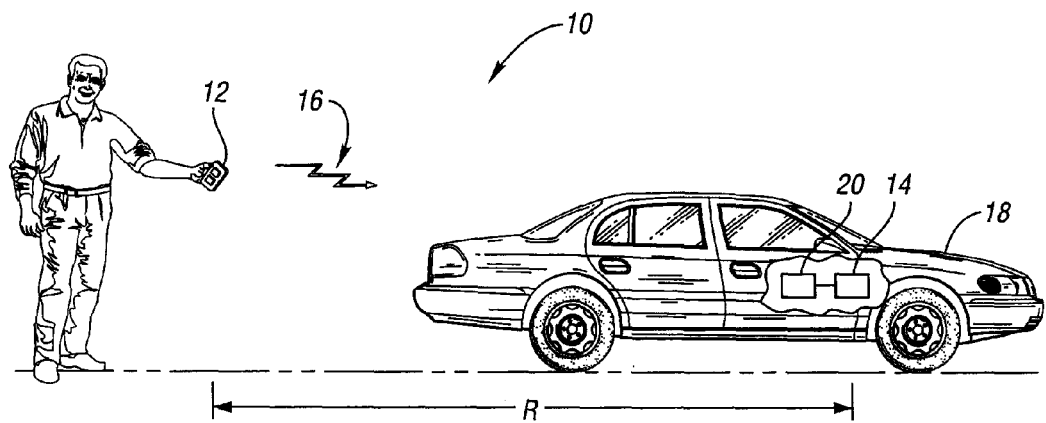
FIG. 1 is a simplified, exemplary environmental block diagram depicting one embodiment of the system described herein.
Figure 2:
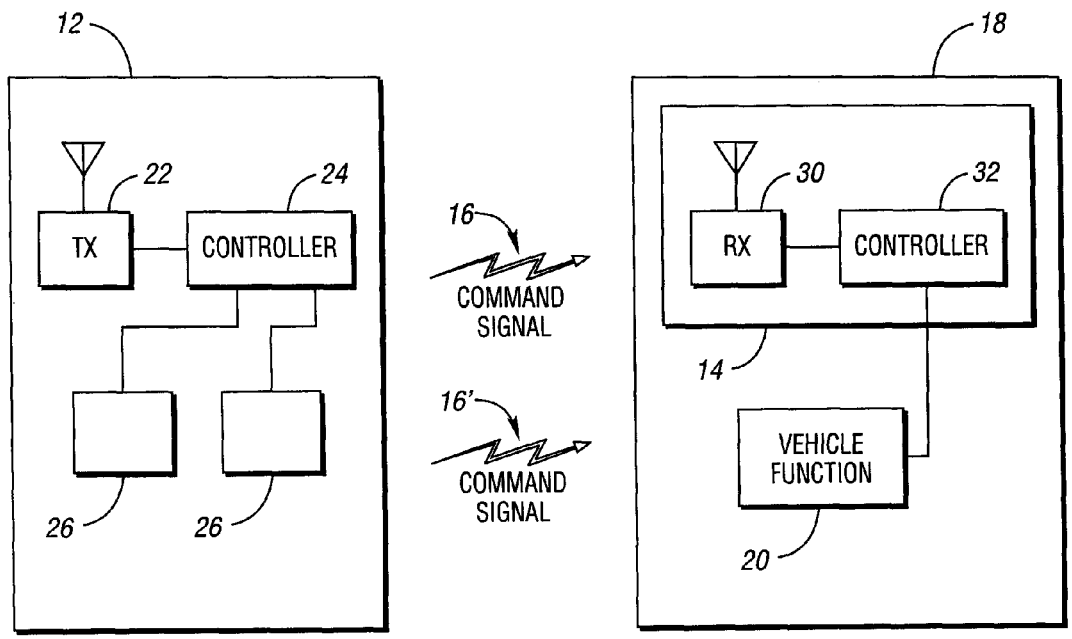
FIG. 2 is a simplified, exemplary block diagram depicting one embodiment of the system described herein.
Figure 3:
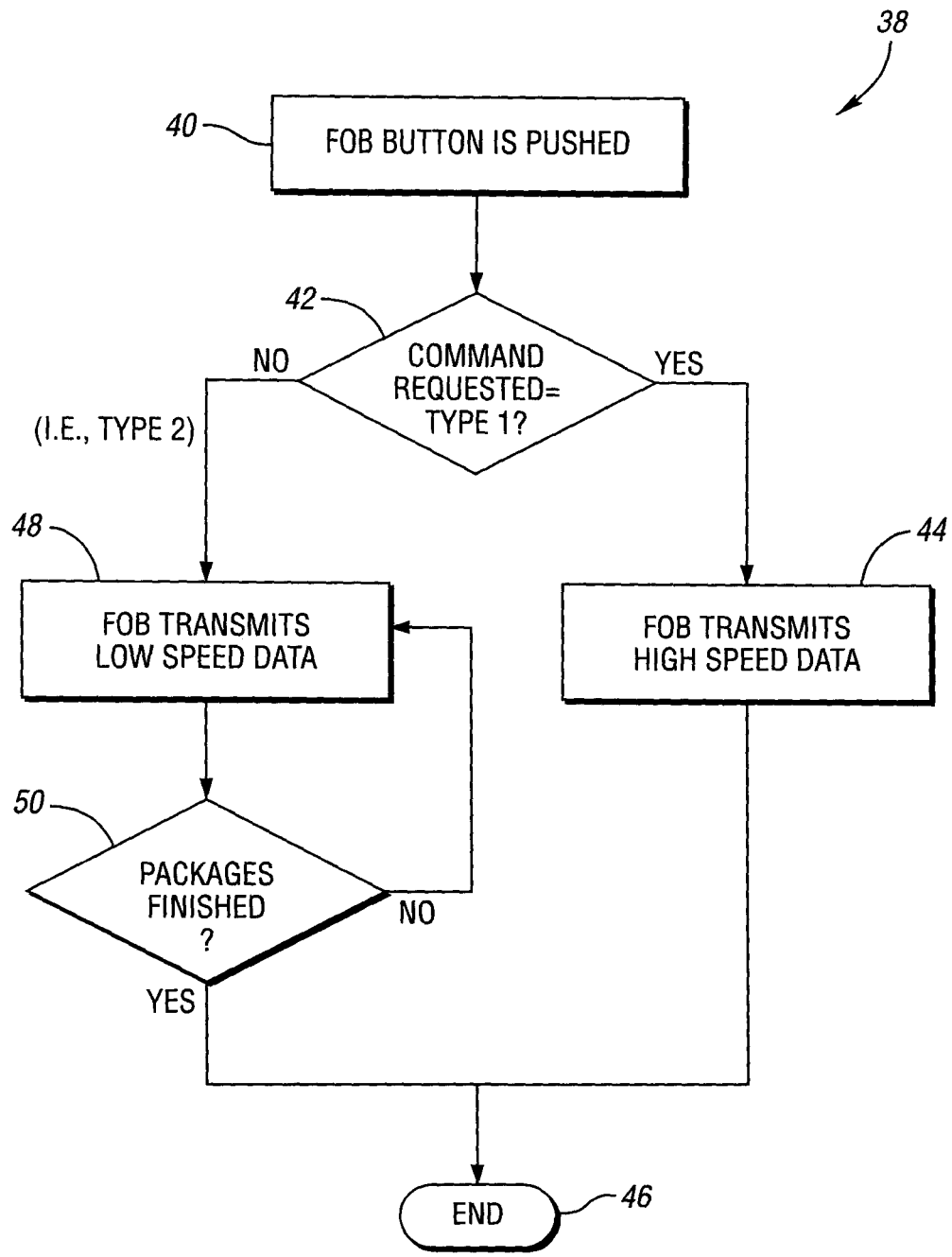
FIG. 3 is a simplified, exemplary flowchart depicting one embodiment of the method described herein.

With reference to FIGS. 1-3, a more detailed description of embodiments of the system and method and various components thereof will now be provided. It is well known in the automotive industry to provide wireless communication systems in vehicles for a variety of applications. These include, but are not limited to, remote keyless entry (RKE), tire pressure monitoring, remote control of garage door opening systems, vehicle immobilzation, voice activated controls, and others.

Typical RKE systems provide for remote control by a vehicle owner or user of vehicle security systems, door locks, trunk latch, exterior and/or interior lights, horn and/or alarms. Other vehicle systems or operations that may be remotely controlled by a vehicle user or owner with RKE systems include sliding-door or lift-gate control, remote engine start, vehicle interior climate control, and others.

In that regard, RKE systems for remote vehicle access and other remote operations include a remote control device or unit, which is commonly referred to as a "fob" or "key fob." The remote control device has a transmitter, and wireless radio frequency ("RF") signals are transmitted by transmitter of the remote control device that include commands for performing vehicle operations or functions such as unlocking the vehicle doors or starting the vehicle engine. Currently available RKE fobs are hand-held, portable devices, and may be separate units or may be part of an ignition key head.

Such RKE systems also typically include a receiver and/or device control unit installed in the vehicle. RF command signals transmitted by the remote control unit are received by the vehicle-mounted receiver and/or device control unit, and may be relayed to appropriate control circuitry, systems or subsystems in the vehicle in order to effectuate the desired operation or function. For example, the receiver and/or control unit may be provided in direct or indirect (e.g., over a vehicle bus) communication with door locking mechanisms to lock and unlock the vehicle doors in response to lock or unlock signals received from the remote unit. Similarly, the receiver and/or control unit may be provided in communication with other vehicle devices to control operation thereof in response to other signals received from the remote unit.

RKE systems may be active or passive in nature. Active systems require a vehicle owner or user to manually transmit a command signal, such as by actuating one or more pushbuttons provided on the remote control unit. In passive systems, signals are automatically transmitted so that, for example, a vehicle door may be unlocked as the vehicle owner or user approaches the vehicle and/or touches the door handle to open the door, without the need for any action by the vehicle owner or user.

In that regard, in a passive keyless entry system, a remote unit, which may be referred to as a "fob" or a "card," is typically provided with a transceiver for communicating with a transceiver and/or control unit installed in the vehicle. In such systems, the remote unit carried by an operator may be used, for example, to automatically unlock the vehicle as the operator approaches the vehicle, without the need for operation of any switch or pushbutton by the operator. Similarly, the system may further be designed to automatically lock the vehicle as the operator, carrying the remote unit, moves away from the vehicle. A vehicle-mounted transceiver and/or control unit is again provided in direct or indirect communication with control circuitry, systems or subsystems to effectuate a particular operation in response to signals received from the remote unit, such as door locking mechanisms to lock and unlock the vehicle doors.

To prevent unauthorized entry into a vehicle equipped with an RKE system, command signals from remote control units are typically encrypted, such as with a rolling-code encryption scheme where a security code is transmitted with the command signal, that code being different with every transmission. The vehicle-mounted device that receives the command signals is equipped with the same rolling-code encryption scheme in order to de-crypt a received command signal and determine which security code to expect with each command signal received. As a result, even if a command signal is intercepted by a third party, that signal cannot later be re-transmitted by the third party in order to gain entry into the vehicle, since the security code transmitted with that command signal will no longer be accepted as valid by the vehicle-mounted receiver and/or control unit.

RKE system are referred to as "one-way" systems where communication or transmission of signals only takes place from the portable remote control device having a transmitter to the vehicle-mounted device having a receiver. However, as is again well known by those of ordinary skill, RKE systems may also be "two-way" in nature. In "two-way" RKE systems, the portable remote control device carried by the vehicle user or owner includes a transceiver, and the vehicle-mounted device also includes a transceiver. As both the remote control device and the vehicle-mounted device are capable of transmitting and receiving wireless signals, two-way communication between those devices is enabled.

Signals transmitted to or from the portable remote control device and/or the vehicle-mounted device in "two-way" RKE systems are again typically encrypted for security purposes. "Two-way" RKE systems also may be either active or passive in nature.

In "two-way" RKE systems, communication from the vehicle-mounted device or unit to the portable remote control device or unit may be for any of a number of purposes, such as for prompting a passive remote control device to transmit a signal, acknowledging the receipt of a command signal from a remote unit, or others. In that regard, the remote control device or unit may be provided with a display, such as a liquid crystal or light emitting diode display, so that the vehicle owner or user can confirm that a command signal has been received by the vehicle-mounted device or unit and that the command has been effectuated (e.g., the vehicle doors have been locked/unlocked; the vehicle engine has been started).

For "two-way" RKE systems in particular, and especially those equipped for remote vehicle engine start, it is increasingly requested that such systems function at long distances from the vehicle. For example, it is often desired that such systems provide for communication between a remote unit and a vehicle control unit over ranges of more than 200 meters.

As previously noted, remote control units are hand-held, portable devices. For durability, the antenna of the remote unit is provided within a device housing, which reduces the antenna gain that can be achieved. Lower antenna gain constrains the operating range between the remote unit and the vehicle-mounted receiver and/or control unit over which transmitted signals can be reliably received.

In RF communication systems, range performance can be improved by using a low data rate for signal transmissions. Range performance can also be improved by increasing transmission power. Transmission power levels, however, are limited by Federal Communication Commission ("FCC") regulations in order to reduce interference with other signal transmissions. Transmission power can be maximized under FCC regulations by dividing or splitting a signal into multiple packets for transmission.

It is also desirable in RKE systems, however, to minimize latency, which may be described as the time required to receive and act on a command signal. The low data rate and data splitting described above that improve range performance in RKE systems also result in an increase in system latency.

Thus, there exists a need for an RKE systems that will enhance system range, and thus functionality, while also providing for acceptable system latency. Such an RKE system would include an adaptive protocol for signal transmission where the format for signals by the remote unit is changed depending on the type of remote function or operation desired by a user.

Referring now to the drawings, FIG. 1 is a simplified, exemplary environmental block diagram depicting one embodiment of an RKE system (10). RKE system (10) comprises a portable remote control device or unit (12) and a vehicle-mounted device or unit (14). The remote unit (12) may be a separate fob or card, part of a vehicle ignition keyhead, or any other suitable configuration known in the art. The remote unit (12) transmits a wireless signal (16), which may be radio frequency ("RF") signal, that includes a command message. Remote unit (12) transmits signal (16) a distance or range (R) from the vehicle (18) in order to remotely perform a desired vehicle operation or function represented by the command message of signal (16), such as locking or unlocking vehicle doors, activating or deactivating a vehicle security system, activating or deactivating vehicle interior and/or exterior lights, starting the vehicle engine, and/or others. Such a transmission by remote unit (12) may be in response to user input, which may be provided to remote unit (12) in any fashion known in the art, such as actuation of a push-button or by voice recognition.

Signal (16) may be received at the vehicle-mounted unit (14), which may be mounted at any suitable location on the vehicle (18). Vehicle-mounted unit (14) relays the command message of the signal (16) to an appropriate vehicle function (20) in order to effectuate the command, such as locking or unlocking vehicle doors, activating or deactivating a vehicle security system, activating or deactivating vehicle interior and/or exterior lights, starting the vehicle engine, and/or others. In that regard, vehicle function (20) may be, for example, a computer, microprocessor, control circuit, logical device, vehicle system, vehicle device, or vehicle subsystem, or other. Relay of the command message by vehicle-mounted unit (14) may include translation of the command message of signal (16) into an output control signal. Vehicle-mounted unit (14) may be provided in direct communication with vehicle function (20), or may be provided in communication with vehicle function (20) indirectly, such as over a vehicle data or communications bus (not shown).

Referring now to FIG. 2, a simplified, exemplary block diagram depicting one embodiment of an RKE system is shown. As seen therein, remote unit (12) comprises a transmitter (22) provided in communication with a controller (24). Remote unit (12) may include one or more buttons or switches (26) which allow a user to provide input to remote unit (12). For example, as illustrated in FIG. 2, user input may be provided to remote unit (12) by actuation of a push-button (26) which interfaces with controller (24). Controller (24) may be a computer, microprocessor, control circuit or other logical device which executes application programs and/or which perform other logical exercises. Controller (24) is configured in any known suitable manner to generate signal (16), which may be in response to user input, and transmitter (22) is configured to transmit signal (16), which may include using any encryption method (e.g., rolling code), radio frequency (e.g., 315 MHz), encoding (e.g., Manchester) and/or any modulation scheme known in the art (e.g., on-off keyed ("OOK") modulation, other forms of amplitude shift keyed ("ASK") modulation, frequency shift keyed ("FSK") modulation, or others).

Vehicle-mounted unit (14) comprises a receiver (30) operative to receive signal (16) provided in communication with a controller (32). Controller (32) may be a computer, microprocessor, control circuit or other logical device which executes application programs and/or which perform other logical exercises. Controller (32) may be operative to process the command message of signal (16) received from receiver (30), which may include de-crypting, decoding and/or de-modulating signal (16). Controller (32) may be provided in direct or indirect communication with vehicle function (20) in order to execute the vehicle function or operation represented by the command message of signal (16), such as locking or unlocking vehicle doors, activating or deactivating a vehicle security system, activating or deactivating vehicle interior and/or exterior lights, starting the vehicle engine, and/or others.

As previously described, range performance can be improved in an RKE system by using a low data rate for signal transmissions, and/or by increasing signal transmission power within the limits allowed under FCC regulations by partitioning, dividing or splitting a signal into multiple packets. As also previously described, however, low data rate and data partitioning result in an increase in system latency.

In that regard, upon receiving user input via a button or switch (26) indicating a desired remote function, controller (24) of remote unit (12) selects one of a plurality of protocols or formats for use in transmitting command signal (16) by transmitter (22). Selection of a particular format or protocol depends upon the type of remote function or operation desired by a user, as represented by the command indicated by user activation of a particular button or switch (26) on remote unit (12). In that regard, one type of command may a command where a shorter latency is desired for effectuating the appropriate remote operation, and/or where it is desired that the remote operation represented by the command is to be enabled only within a shorter range between the remote unit and the vehicle. Examples of this type of command may be door unlock, trunk unlatch, panic alarm activation, and exterior light activation.

For such commands, an appropriate protocol for use in transmitting a command signal may comprise a high data or bit rate, such as, for example, on the order of 10 K-bits/second. However, other high transmission data rates could be used, such as, for example, transmission data rates in the range of approximately 5 K-bits/second to 20 K-bits/second. Such a protocol may also or alternatively comprise a particular fashion in which command signal (16) is modulated. In that regard, examples of modulation schemes known in the art include ASK, OOK and FSK. Any of these modulation schemes or others known in the art could be used.

Receiver (30) of vehicle-mounted unit (14) is provided for receiving command signal (16) having the high data rate and/or particular modulation scheme. The command message of signal (16) is again subsequently effectuated as described in detail above.

Such a high data rate protocol enables reception of command signal (16) by vehicle-mounted device (14) with a shorter system latency, particularly given a shorter range. That is, where the vehicle user operating remote unit (12) is in closer proximity to vehicle (18), a shorter period of time exists for effectuating the desire remote function and a shorter system latency is desired so as not to be as perceptible to the vehicle user. In addition, such a high data rate transmission at such a relatively shorter range can be undertaken using less transmission power. Thus, for user desired remote functions or operations where a shorter latency is desirable and/or enablement of a shorter operational range is desired, such as, for example, door unlock, trunk unlatch, panic alarm activation, or exterior light activation, controller (24) selects a high data rate protocol for use in transmitting an appropriate command signal by transmitter (22), thereby providing for effectuation of the desired remote operation with a shorter latency, and/or enabling operation of that remote function over a relatively shorter range. Particular modulation schemes, such as, for example, FSK modulation, also allow for a shorter operational range.

However, depending upon the nature or type of the command represented by user activation of a particular button or switch (26) on remote unit (12), controller (24) of remote unit (12) may select a different or alternative protocol or format from among a plurality of protocols or formats according to which a command signal (16') representative of the user desired remote function or operation is transmitted. That is, the system is adaptive in that a different protocol or format is used for signal transmission depending upon the nature or type the command represented by user activation of a button or switch (26) on remote unit (24). In that regard, another type of command may be a command where a longer latency is acceptable for effectuating the appropriate remote operation, and/or where it is desired that the remote operation represented by the command is to be enabled over a longer range between the remote unit and the vehicle. Examples of this type of command may be remote engine start, interior light activation, and climate control activation.

For such commands, an appropriate alternative protocol or format may comprise a low data or bit rate, such as, for example, on the order of 1 K-bit/second. However, other low transmission data rates could be used, such as, for example, transmission bit rates in the range of approximately 500 bits/second to 2 K-bits/second. Such an alternative protocol may also or alternatively comprise data partitioning. That is, command signal (16') may be divided into multiple packets, where each packet includes a portion of the command signal (16'). For example, command signal (16') may be divided into four packets transmitted over a period of 400 milliseconds, where each packet may be 20 milliseconds in length, and may be transmitted serially with periods of 80 milliseconds between those packets. Other partitioning schemes or methods could also be used.

Such a protocol may also or alternatively comprise a particular fashion in which command signal (16) is modulated. In that regard, examples of modulation schemes known in the art include ASK, OOK and FSK. Any of these modulation schemes or others known in the art could be used.

Receiver (30) of vehicle-mounted unit (14) is also configured to receive command signal (16') having the low data rate and/or partitioned into multiple packets and/or having a particular modulation scheme. In that regard, where command signal (16') is transmitted as multiple packets, controller (34) of vehicle-mounted unit (14) is configured to assemble those received packets into command signal (16'). The command message of signal (16') is subsequently effectuated as previously described.

Such a low data rate and/or partitioned signal protocol allows for higher transmission power and more reliable reception of command signal (16') by vehicle-mounted device (14) over a greater range, as previously described. While system latency may increase, such increased latency is acceptable where there exits a greater distance between remote unit (12) from vehicle (18). That is, where the vehicle user operating remote unit (12) is at a greater distance from vehicle (18), a greater period of time exists for effectuating the desire remote function and the increased latency is not as perceptible to the vehicle user. Thus, for user desired remote functions or operations where a longer latency is acceptable and/or a greater operational range is desired, such as, for example, remote engine start, climate control activation, or interior light activation, controller (24) selects a low data rate and/or partition protocol for use in transmitting a command indicative of such a desired operation by transmitter (22). Particular modulation schemes, such as, for example, ASK modulation, also improve or provide for greater operational range.

Referring now to FIG. 3, a simplified, exemplary flowchart depicting one embodiment of an RKE method (38) is shown. As seen therein, upon user actuation of a remote unit or fob push-button (40) representing a command for a remote operation, the remote unit determines if the command selected by the user is of a first type (42). Such a first type may be a type of command where a shorter latency is desired for effectuating the command, and/or where it is desired that the remote operation represented by the command is to be enabled over a shorter range between the remote unit and the vehicle.

In such a circumstance, the command signal may be transmitted according to a protocol or format that comprises a high data or bit rate (44), such as, for example, on the order of 10 K-bits/second. However, other high transmission data rates could be used, such as, for example, transmission data rates in the range of approximately 5 K-bits/second to 20 K-bits/second. Such a protocol may also or alternatively comprise a particular fashion in which command signal (16) is modulated. In that regard, examples of modulation schemes known in the art include ASK, OOK and FSK. Any of these modulation schemes or others known in the art could be used. Action then ends (46).

Such a high data rate protocol enables reception of the command signal by the vehicle-mounted unit with a shorter system latency, particularly given a relatively short range between the remote unit and the vehicle-mounted unit. That is, where the vehicle user operating the remote unit is in closer proximity to the vehicle, a shorter period of time exists for effectuating the desire remote function and a shorter system latency is desired so as not to be as perceptible to the vehicle user. Such a high data rate transmission at such a relatively shorter range can also be undertaken using less transmission power. In addition, where a relatively shorter operational range is desirable for particular commands, such a high data rate transmission may be used to enable such a range. Particular modulation schemes, such as, for example, FSK modulation, also allow for a shorter operational range.

Alternatively, remote unit may determine that the command selected by the user is not of a first type (42). For example, the command selected by the user may be of a second type where a longer latency is acceptable for effectuating the command, and/or where it is desirable that the remote operation represented by the command is to be enabled over a larger range between the remote unit and the vehicle.

In such circumstances, the remote unit may select a different or alternative protocol or format from among a plurality of protocols or formats according to which the command signal representative of the user desired remote function or operation is transmitted. That is, the method is adaptive in that a different protocol or format is used for signal transmission depending upon the nature or type the command represented by user activation of a button or switch on the remote unit. Such an alternative protocol may comprise a low data or bit rate (48), such as, for example, on the order of 1 K-bit/second. However, other transmission data rates could be used, such as, for example, in the range of approximately 500 bits/second to 2 K-bits/second.

Such a protocol may also or alternatively comprise data partitioning. That is, the command signal may be divided into multiple packets, where each packet includes a portion of the command signal. For example, command signal may be divided into four packets transmitted over a period of 400 milliseconds, where each packet may be 20 milliseconds in length, and may be transmitted serially with periods of 80 milliseconds between those packets. Other partitioning schemes or methods could also be used.

Such a protocol may also or alternatively comprise a particular fashion in which command signal (16) is modulated. In that regard, examples of modulation schemes known in the art include ASK, OOK and FSK. Any of these modulation schemes or others known in the art could be used.

If all packets have not been transmitted (50), transmission of the packets continues (48). When all packets have been transmitted (50), transmission of the packets ceases and action ends (46). The vehicle-mounted unit assembles the packets, and the command message of the signal is subsequently effectuated as previously described.

Such a low data rate and/or partitioned signal protocol allows for higher transmission power and more reliable reception of command signal by vehicle-mounted device over a longer range, as previously described. While system latency may increase, such increased latency is acceptable where there exist a greater distance between the remote unit and the vehicle. That is, where the vehicle user operating the remote unit is at a greater distance from the vehicle, a greater period of time exists for effectuating the desire remote function and the increased latency is not as perceptible to the vehicle user. Particular modulation schemes, such as, for example, ASK modulation, also improve or provide for greater operational range.

It should be noted that the method of FIG. 3 as described herein is exemplary only, and that the functions or steps of the method could be undertaken other than in the order described and/or simultaneously as may be desired, permitted and/or possible.

While various embodiments have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for remote activation of a device, the system comprising:
    a remote unit comprising
        a user interface for selecting a remote activation command,
        a transmitter for transmitting a remote activation command signal according to one of a first transmission protocol and a second transmission protocol, wherein a difference between the first and second transmission protocols comprises partition of the command signal, and
        a controller for selecting the first transmission protocol for use in transmitting a remote activation command signal when a user selected remote activation command is of a first type, and selecting the second transmission protocol for use in transmitting a remote activation command signal when a user selected remote activation command is of a second type, wherein the first type of command comprises a command identified by the controller as having a first latency assigned thereto for effectuating the command, and the second type of command comprises a command identified by the controller as having a second latency assigned thereto for effectuating the command, the second latency less than the first latency.

2. The system of claim 1 wherein the first transmission protocol comprises a first data rate and the second transmission protocol comprises a second data rate different from the first data rate.

3. The system of claim 1 wherein the first transmission protocol comprises a first data rate and partition of the command signal, and wherein the second transmission protocol comprises a second data rate greater than the first data rate.

4. The system of claim 1 wherein the first type of command comprises a vehicle engine start command.

5. The system of claim 1 wherein the second type of command comprises a vehicle door unlock command.

6. The system of claim 1 wherein the first transmission protocol comprises a first modulation scheme and the second transmission protocol comprises a second modulation scheme different than the first modulation scheme.

7. The system of claim 3 wherein partition of the command signal comprises dividing the command signal into a plurality of packets, each packet for transmission by the transmitter.

8. The system of claim 7 further comprising a device unit, the device unit comprising:
    a receiver for receiving the plurality of packets transmitted by the transmitter when the first transmission protocol is selected, and receiving the command signal transmitted by the transmitter when the second transmission protocol is selected; and
    a controller for assembling the plurality of packets into the command signal when the first transmission protocol is selected.

9. A system for remote activation of a device, the system comprising:
    a remote unit comprising:
        a user interface for selecting a remote activation command, a transmitter for transmitting a remote activation command signal according to one of a first transmission protocol and a second transmission protocol, wherein a difference between the first and second transmission protocols comprises partition of the command signal into a plurality of packets, and a controller for selecting the first transmission protocol for use in transmitting a remote activation command signal when a user selected remote activation command is of a first type, and selecting the second transmission protocol for use in transmitting a remote activation command signal when a user selected remote activation command is of a second type, wherein the first type of remote activation command comprises a command identified by the controller as having a first latency assigned thereto for effectuating the command, and the second type of remote activation command comprises a command identified by the controller as having a second latency assigned thereto for effectuating the command, the second latency less than the first latency; and a device unit comprising:
a receiver for receiving the remote activation command signal transmitted by the remote unit.

10. The system of claim 9 wherein the first type of command comprises a vehicle engine start command.

11. The system of claim 9 wherein the second type of command comprises a vehicle door unlock command.

12. The system of claim 9 wherein the first transmission protocol comprises a first modulation scheme and the second transmission protocol comprises a second modulation scheme different than the first modulation scheme.

13. A method for remote activation of a device, the method comprising:
selecting a first transmission protocol for use in transmitting a remote activation command signal when a user selected remote activation command is of a first type;

selecting a second transmission protocol for use in transmitting a remote activation command signal when a user selected remote activation command is of a second type; and transmitting a remote activation command signal according to the selected one of the first transmission protocol and the second transmission protocol, wherein a difference between the first and second transmission protocols comprises partition of the command signal;

wherein the first type of command comprises a command having a first latency assigned thereto for effectuating the command, and the second type of command comprises a command having a second latency assigned thereto for effectuating the commend, the second latency less than the first latency.

14. The method of claim 13 wherein the first transmission protocol comprises a first data rate and partition of the command signal, and wherein the second transmission protocol comprises a second data rate greater than the first data rate.

15. The method of claim 13 wherein the first type of command comprises a vehicle engine start command.

16. The method of claim 13 wherein the second type of command comprises a vehicle door unlock command.

17. The method of claim 14 wherein partition of the command signal comprises dividing the command signal into a plurality of packets, each packet for transmission by the transmitter.

18. The method of claim 17 further comprising:
receiving the plurality of packets transmitted when the first transmission protocol is selected;
receiving the command signal transmitted when the second transmission protocol is selected; and
assembling the plurality of packets into the command signal when the first transmission protocol is selected.

* * * * *

UNITED STATES PATENT AND TRADEMARK OFFICE
CERTIFICATE OF CORRECTION

PATENT NO.        : 9,262,878 B1
APPLICATION NO.   : 11/536200
DATED             : February 16, 2016
INVENTOR(S)       : Ghabra et al.

It is certified that error appears in the above-identified patent and that said Letters Patent is hereby corrected as shown below:

In the claims

Column 10, Line 14, Claim 13:

Delete "commend" and
Insert -- command --.

Signed and Sealed this
Nineteenth Day of April, 2016

Michelle K. Lee
*Director of the United States Patent and Trademark Office*